Dec. 22, 1964   F. McCURTAIN   3,162,723
SHOCK MOUNTING FOR HIGH VOLTAGE TUBES
Filed Sept. 5, 1961
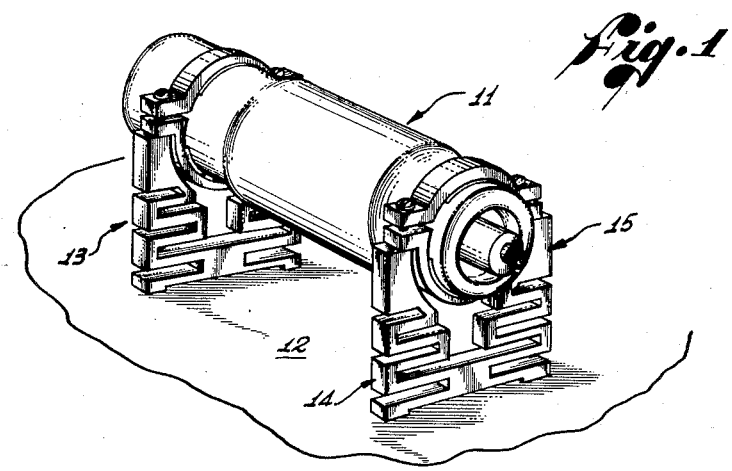
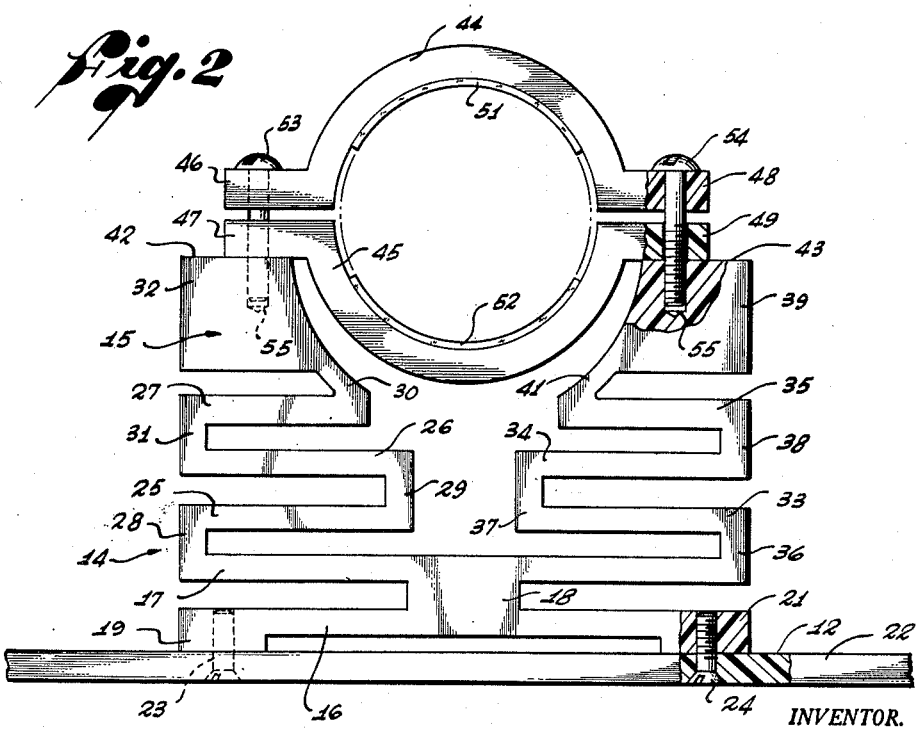
INVENTOR.
FRANK McCURTAIN
BY
ATTORNEYS

United States Patent Office 3,162,723
Patented Dec. 22, 1964

3,162,723
SHOCK MOUNTING FOR HIGH VOLTAGE TUBES
Frank McCurtain, 1835 S. Bonnie Brae, Los Angeles 6, Calif., assignor of one-half to Zack E. Gibbs, San Marino, Calif.
Filed Sept. 5, 1961, Ser. No. 135,871
13 Claims. (Cl. 174—138)

The present invention relates to a mounting for electronic tubes, and more particularly to a mounting for high voltage electronic tubes, protecting the same against shock.

In the mounting of electronic tubes under conditions in which the apparatus with which they are associated may be subjected to blows, vibration, and other abrupt physical forces, it is desired that the mounting protect the tubes against shock so as to prevent damage to the relatively sensitive elements within the tube and to the tube envelope. At the same time, when the electronic tubes are of the high voltage type, it is desired that the mounting provide a long over-the-surface leakage path to prevent breakdown of the insulation between the voltage elements of the tube or between the high voltage element of the tube and ground. According to the present invention, there is provided a shock mounting for high voltage electronic tubes which has a limited resiliency to protect the tube elements from shock forces, while at the same time providing a long over-the-surface leakage path having high resistance against electrical breakdown.

It is therefore an object of the present invention to provide a mounting for electronic tubes which shall mechanically insulate the tube against shock and electrically insulate the tube from exterior breakdown.

Another object of this invention is the provision of a mounting for electronic tubes having a limited resiliency and a long over-the-surface leakage path.

Another object of this invention is the provision of a shock mounting for high voltage vacuum tubes including a pair of mounts spaced to engage the tube adjacent to its opposite ends and each having a pair of legs of substantially zigzag configuration providing a limited resiliency and a long over-the-surface leakage path to the mounts.

Another object of this invention is the provision of a shock mounting for high voltage electronic tubes in which the tubes are clamped within spaced mounts, each of which includes spaced legs of substantially zigzag conformation providing a limited resiliency and a long over-the-surface leakage path, with the spaced legs joined together remote from the tubes and connected adjacent a midpoint to the midpoint of a platform engaged only adjacent its ends with a supporting surface.

These and other objects and features of the invention will be readily apparent to those skilled in the art from the following specification and the appended drawing, in which:

FIGURE 1 is a perspective view of a mounting for an electronic tube according to the present invention; and
FIGURE 2 is an elevational view, partly in section, of one of the mounts for the tube mounting of FIGURE 1.

An electronic tube of the high voltage type is indicated generally by the numeral 11 in FIGURE 1. The tube is mounted with its axis parallel to a supporting surface 12 by a pair of mounts 13 and 14 adjacent the opposite ends of the tube 11. The mounts 13 and 14 may be formed in any desired manner and are specifically illustrated as including a lower portion 15 integral in form and milled, sawed, or otherwise shaped from a single plate of electrical insulating material, such as Micarta. Alternatively, it will be understood that the portions 15 of the mounts may be formed from individual pieces which are cemented or fused together, or may be molded in one piece from a thermoplastic or thermosetting electrical insulating material, such as a phenolic resin.

Since the mounts 13 and 14 are identical, only the mount 14 of FIGURE 2 will be specifically described. The portion 15 of the mount 14 is made up of a pair of lower parallel arms 16 and 17 extending across the entire width of the mount and joined together adjacent their midpoints only by a web 18. The lowermost arm 16 is provided with spaced feet 19 and 21 adjacent its ends which engage the supporting surface 12 to thus space the main body of the arm 16 therefrom. The surface 12 is indicated in FIGURE 2 as being carried by a plate 22 through which extend studs 23 and 24 passing through countersunk clearance holes in the plate 22 and threaded into complementary holes within the ends of the arm 16.

Above the arm 17 the lower portion 15 of the mount divides into two spaced legs each of which is of substantially zigzag configuration. At the left-hand side of the mount 14, as viewed in FIGURE 2, arms 25, 26, and 27 are disposed above and parallel to the arm 17 and are joined at alternate ends to the arm 17 and to each other by means of vertical risers 28, 29, and 31 to form a substantially zigzag configuration. Above the arm 27 is an attachment 32 joined thereto by a connecting web 30.

At the right-hand side of the mount, as viewed in FIGURE 2, the elements 25 through 32 are duplicated in reverse as arms 33, 34, and 35, joined to themselves and to each other by the vertical risers 36, 37, and 38 at alternate ends of the arms to produce a zigzag configuration. An attachment portion 39 is connected to the upper arm 35 by a connecting web 41. The attachment portions 32 and 39 provide mounting platforms 42 and 43, respectively.

For mounting the electronic tube to the platforms 42 and 43 there is provided, for each mount, a pair of complementary semi-cylindrical clamping means 44 and 45 having confronting radially projecting arms 46–47 and 48–49. The ends of the electronic tube are placed between the semi-cylindrical clamping means 44 and 45 with strips of shock-absorbent or cushioning material, such as cork, disposed between the envelope of the tube and the clamping means, as indicated at 51 and 52. Studs 53 and 54 extend through clearance holes in the arms 46–47 and 48–49 and are threaded into complementary holes 55 in the attachment portions 32 and 39. It will be noted that the opposed faces of the attachment portions 32 and 39 are curved as shown to provide clearance to the clamping means 45.

The mounts 13 and 14 are substantially identical and each conforms to the description given above in detail for FIGURE 2. It will thus be seen that each end of the electronic tube is securely mounted within the clamping means 44–45 and, through the arms 46–47 and 48–49, to the attachment portions 32 and 39 on the mounts 13 and 14. These attachment portions 32 and 39 are carried at the upper ends of a pair of spaced legs, each of which is of zigzag configuration. These legs are joined by the vertical risers 28 and 36 to the arm 17 which is in turn connected by the central web 18 to the lower arm 16 supported in spaced relation to the surface 12 by the feet 19 and 21. The spaced zigzag legs of each mount are connected together adjacent their tops by the clamping means 44–45 so as to provide a strong mechanical construction, while the zigzag configuration of the individual legs provides a substantial resiliency to the mount for the absorption of shock forces, and at the same time provides a long over-the-surface leakage path against electrical breakdown. Thus, to traverse an over-the-surface path to the tube 11 from the surface 12 it is necessary to go from the feet 19, 21 at the opposite ends of the arm 16 to the central web 18, then outwardly along arm 17 to the vertical risers 28, 36, then inwardly along the arms 25, 33 to the vertical risers 29, 37, again outwardly along the arms 26, 34 to the vertical risers 31, 38, again inwardly along the arms 27, 35 and through the webs 30, 41 to the mounting portions 32, 39, and thence through the clamping means to the tube. There is thus provided a long over-the-surface leakage path against electrical breakdown between the opposite high potential terminals of the tube and between the high potential terminal of the tube and ground. Also, as stated above, the configuration of the mount is such that even with substantially rigid material, a certain springiness or resiliency is given to the mount by its zigzag construction so that it tends to absorb shock forces which may appear in the plate 22 and thus insulates the tube 11 mechanically against shock, to protect the sensitive elements within the tube and the tube envelope against injury from such shock forces.

While the arm 16 and the central web 18 increase both the shock absorption characteristics and leakage path resistance of the mounts, it will be understood that they may be omitted in certain cases for simplicity, and the feet 19 and 21 placed at the opposite ends of the arm 17. The spaced zigzag legs on the mount will in this case be retained and will function as before to provide for shock absorption and along over-the-surface leakage path. Other modifications as well or within the spirit of the invention and will appear to those skilled in the art, so that the invention is not to be limited to the specific embodiment shown and described, but is to be given its broadest interpretation within the terms of the following claims:

I claim:

1. An insulating mount for high voltage electronic tubes comprising: a first set of superposed parallel arms; means joining alternate ends of said arms into a substantially zigzag configuration to form a supporting leg; a second set of superposed parallel arms; means joining alternate ends of said second set of arms into a substantially zigzag configuration to form a second supporting leg, said legs being formed of electrical insulating material; means mounting said supporting legs at one end in edgewise spaced relation; and supporting means for an electronic tube extending between and interconnecting the free ends of said legs to provide a strong mechanical construction and edgewise intersupport between the legs at their free ends.

2. An insulating mount for high voltage electronic tubes comprising: a first set of superposed parallel arms; means joining alternate ends of said arms into a substantially zigzag configuration to form a supporting leg; a second set of superposed parallel arms; means joining alternate ends of said second set of arms into a substantially zigzag configuration to form a second supporting leg; a base arm parallel to said sets of arms and connected thereto adjacent its ends in continuation of the zigzag configuration of the sets whereby said individual legs are supported in edgewise spaced relation, said legs being formed of electrical insulating materials; and supporting means for an electronic tube extending between and interconnecting the free ends of said legs to provide a strong mechanical construction and edgewise intersupport between the legs at their free ends.

3. An insulating mount for high voltage electronic tubes comprising: a first set of superposed parallel arms; means joining alternate ends of said arms into a substantially zigzag configuration to form a supporting leg; a second set of superposed parallel arms; means joining alternate ends of said second set of arms into a substantially zigzag configuration to form a second supporting leg; a base arm parallel to said sets of arms and connected thereto adjacent its ends in continuation of the zigzag configuration of the sets whereby said individual legs are supported in edgewise spaced relation, said legs being formed of electrical insulating material; clamping means for receiving and holding an electronic tube; and means for mounting said clamping means on the free ends of said legs, said clamping means extending between and interconnecting the free ends of said legs to provide a strong mechanical construction and edgewise intersupport between the legs at their free ends.

4. An insulating mount for high voltage electronic tubes comprising: a first set of superposed parallel arms; means joining alternate ends of said arms into a substantially zigzag configuration to form a supporting leg; a second set of superposed parallel arms; means joining alternate ends of said second set of arms into a substantially zigzag configuration to form a second supporting leg; a base arm parallel to said sets of arms and connected thereto adjacent its ends in continuation of the zigzag configuration of the sets whereby said individual legs are supported in edgewise spaced relation; a second base arm parallel to said first base arm; a web interconnecting said base arms adjacent their midpoints; means for mounting said second base arm to support the mount; and supporting means for an electronic tube mounted on the free ends of said legs and serving also to connect said leg ends.

5. An insulating mount for high voltage electronic tubes comprising: a first set of superposed parallel arms; means joining alternate ends of said arms into a substantially zigzag configuration to form a supporting leg; a second set of superposed parallel arms; means joining alternate ends of said second set of arms into a substantially zigzag configuration to form a second supporting leg; a base arm parallel to said sets of arms and connected thereto adjacent its ends in continuation of the zigzag configuration of the sets whereby said individual legs are supported in edgewise spaced relation; a second base arm parallel to said first base arm; a web interconnecting said base arms adjacent their midpoints; mounting feet beneath said second base arm for spacing the intermediate portion thereof from a supporting surface; means mounting said feet upon the supporting surface to support said mount; and supporting means for an electronic tube mounted on the free ends of said legs.

6. An insulating mount for high voltage electronic tubes comprising: a first set of superposed parallel arms; means joining alternate ends of said arms into a substantially zigzag configuration to form a supporting leg; a second set of superposed parallel arms; means joining alternate ends of said second set of arms into a substantially zigzag configuration to form a second supporting leg; a base arm parallel to said sets of arms and connected thereto adjacent its ends in continuation of the zigzag configuration of the sets whereby said individual legs are supported in edgewise spaced relation; a second base arm parallel to said first base arm; a web interconnecting said base arms adjacent their midpoints; mounting feet beneath said second base arm for spacing the intermediate portion thereof from a supporting surface; means mounting said feet upon the supporting surface to support said mount; a pair of complementary semicylindrical clamping elements adapted to receive an electronic tube therebetween in supporting relation; radial arms extending outwardly from said clamping elements; and means mounting said radial arms to the free ends of said legs to support the tube and to structurally interconnect the ends of the legs.

7. An insulating mount for high voltage electronic tubes comprising: a first set of superposed parallel arms; means joining alternate ends of said arms into a substantially zigzag configuration to form a supporting leg; a second set of superposed parallel arms; means joining alternate ends of said second set of arms into a substantially zigzag configuration to form a second supporting leg; a base arm parallel to said sets of arms and connected thereto adjacent its ends in continuation of the zigzag configuration of the sets whereby said individual legs are supported in edgewise spaced relation; a second base arm parallel to said first base arm; a web interconnecting said base arms adjacent their midpoints; mounting feet beneath said second base arm for spacing the intermediate portion of the base arm from a mounting surface; means mounting said feet upon the supporting surface to support said mount; a pair of complementary semicylindrical clamping elements adapted to receive an electronic tube therebetween in supporting relation; radial arms extending outwardly from said clamping elements; and means mounting said radial arms to the free ends of said legs to support the tube and to structurally interconnect the ends of the legs, the opposed faces of said spaced legs being cut away adjacent their upper ends to provide clearance for the lower semicylindrical clamping element.

8. A mounting for supporting a high voltage electronic tube in generally parallel relation to a supporting surface comprising: a pair of spaced insulating mounts, each of which has clamping means for supportingly receiving an end of an electronic tube therein, each of said mounts comprising a pair of supporting legs of electrical insulating material mounted at their lower ends in edgewise spaced relation and mounting said clamping means at their upper ends, each of said legs comprising a set of superposed parallel arms joined at alternate ends into a substantially zigzag configuration, each clamping means extending between and interconnecting the upper ends of the legs on which it is mounted to provide a strong mechanical construction and edgewise intersupport between the edgewise spaced legs at their upper ends.

9. A mounting for supporting a high voltage electronic tube in generally parallel relation to a supporting surface comprising: a pair of spaced insulating mounts, each of which has clamping means for supportingly receiving an end of an electronic tube therein, each of said mounts comprising a pair of supporting legs of electrical insulating material mounted at their lower ends in edgewise spaced relation and mounting said clamping means at their upper ends, each of said legs comprising a set of superposed parallel arms joined at alternate ends into a substantially zigzag configuration; a base arm for each mount common to and parallel to the arms of the legs of its mount and connected to said leg arms adjacent its opposite ends in a continuation of the zigzag configuration of the legs; and means mounting said base arms to support the mounts.

10. A mounting for supporting a high voltage electronic tube in generally parallel relation to a supporting surface comprising: a pair of spaced insulating mounts, each of which has clamping means for supportingly receiving an end of an electronic tube therein, each of said mounts comprising a pair of supporting legs mounted at their lower ends and mounting said clamping means at their upper ends, each of said legs comprising a set of superposed parallel arms joined at alternate ends into a substantially zigzag configuration; a base arm for each mount common to and parallel to the arms of the legs of its mount and connected to said leg arms adjacent its opposite ends in a continuation of the zigzag configuration of the legs; a second base arm parallel to the first base arm of each mount; means interconnecting the base arms of each mount adjacent the midpoints thereof; and means mounting said second base arms to support the mounts.

11. A mounting for supporting a high voltage electronic tube in generally parallel relation to a supporting surface comprising: a pair of spaced insulating mounts, each of which has clamping means for supportingly receiving an end of an electronic tube therein, each of said mounts comprising a pair of supporting legs mounted at their lower ends and mounting said clamping means at their upper end, each of said legs comprising a set of superposed parallel arms joined at alternate ends into a substantially zigzag configuration; a base arm for each mount common to and parallel to the arms of the legs of its mount and connected to said leg arms adjacent its opposite ends in a continuation of the zigzag configuration of the legs; a second base arm parallel to the first base arm of each mount; means interconnecting the base arms of each mount adjacent the midpoints thereof; means mounting said second base arms to support the mounts, each of said clamping means including a pair of complementary semicylindrical clamping elements embracing the end of the tube and having radially projecting arms integral therewith mounted on and connecting the free ends of the legs.

12. A mounting for supporting a high voltage electronic tube in generally parallel relation to a supporting surface comprising: a pair of spaced insulating mounts, each of which has clamping means for supportingly receiving an end of an electronic tube therein, each of said mounts comprising a pair of supporting legs mounted at their lower ends and mounting said clamping means at their upper ends, each of said legs comprising a set of superposed parallel arms joined at alternate ends into a substantially zigzag configuration; a base arm for each mount common to and parallel to the arms of the legs of its mount and connected to said leg arms adjacent its opposite ends in a continuation of the zigzag configuration of the legs; a second base arm parallel to the first base arm of each mount; means interconnecting the base arms of each mount adjacent the midpoints thereof; and means mounting said second base arms to support the mounts, each of said clamping means including a pair of complementary semicylindrical clamping elements embracing the end of the tube and having radially projecting arms integral therewith mounted on and connecting the free ends of the legs, and cushioning means disposed between said semicircular elements and the envelope of the tube.

13. A mounting for supporting a high voltage electronic tube in generally parallel relation to a supporting surface comprising: a pair of spaced insulating mounts, each of which has clamping means for supportingly receiving an end of an electronic tube therein, each of said mounts comprising a pair of supporting legs mounted at their lower ends and mounting said clamping means at their upper end, each of said legs comprising a set of superposed parallel arms joined at alternate ends into a substantially zigzag configuration; a base arm for each mount common to and parallel to the arms of the legs of its mount and connected to said leg arms adjacent its opposite ends in a continuation of the zigzag configuration of the legs; a second base arm parallel to the first base arm of each mount; means interconnecting the base arms of each mount adjacent the midpoints thereof; and supporting feet at the opposite ends of said second base arms for mounting said second base arms with the intermediate portion thereof in spaced relation to a supporting surface, each of said clamping means including a pair of complementary semicylindrical clamping elements embracing the end of the tube and having radially projecting arms integral therewith mounted on and connecting the free ends of the legs.

References Cited in the file of this patent

UNITED STATES PATENTS

| 345,767 | Buckley | July 20, 1886 |
| 1,125,742 | Sessions | Jan. 19, 1915 |
| 1,873,834 | Fleckenstein et al. | Aug. 23, 1932 |
| 2,852,092 | Fruth et al. | Sept. 16, 1958 |